UNITED STATES PATENT OFFICE.

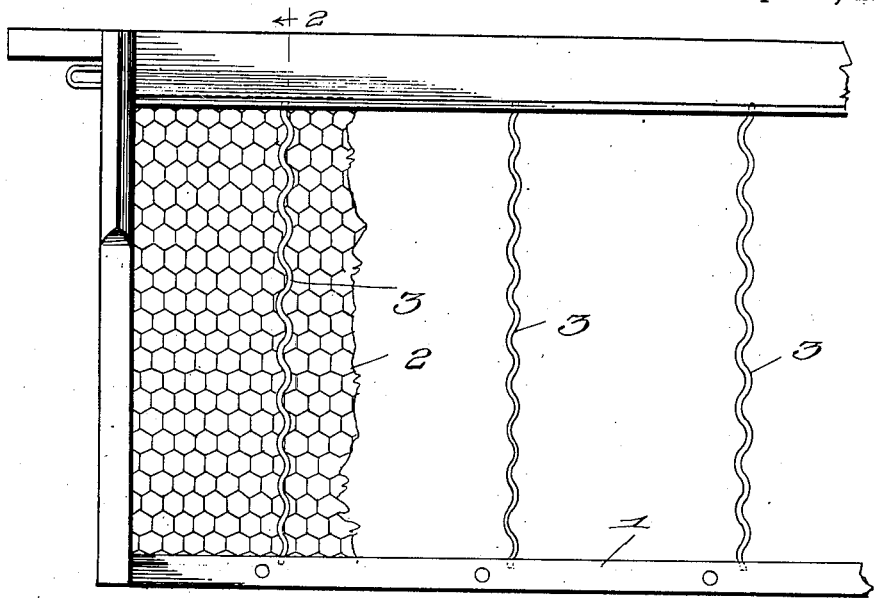

HENRY C. DADANT, OF HAMILTON, ILLINOIS.

REENFORCEMENT FOR BEE COMBS.

1,412,457. Specification of Letters Patent. Patented Apr. 11, 1922.

Application filed July 28, 1920, Serial No. 399,511. Renewed March 8, 1922. Serial No. 542,171.

*To all whom it may concern:*

Be it known that I, HENRY C. DADANT, a citizen of the United States, and a resident of Hamilton, in the county of Hancock and State of Illinois, have invented certain new and useful Improvements in Reenforcements for Bee Combs, of which the following is a specification.

My invention is an improvement in reenforcements for bee combs, and has for its object to provide a reenforcement of the character specified, to prevent sagging and consequent distortion and breaking down of bee comb foundations on account of the atmospheric changes, weight and the heat of the working honey bees, weight of the comb, honey, pollen brood and young unhatched bees, and on account of the stress and strain on the foundation and comb during handling and transportation.

In the drawings,

Figure 1 is a front view of a portion of a comb frame provided with the improved reenforcement, Figure 2 is a section on the line 2—2 of Figure 1, Figures 3, 4, 5 and 6 are perspective views showing different forms of reenforcement.

As is known, honey comb built on artificially constructed comb foundations frequently sags, becomes distorted, and breaks down because of lack of reenforcement and because of sagging or breaking down of the foundation. The weight of the comb, bees, honey, pollen, brood and young unhatched bees and the heat of the bees working on the comb foundation, and frequently the heat of the atmosphere causes this sagging, distortion and breaking down, as well as the stress and strain on the comb foundation and honey comb during handling and transportation.

In the present embodiment of the invention, the comb foundation and the comb is reinforced by reinforcing bars which are arranged in the frame indicated at 1, between the side members thereof, the said reinforcing bars being arranged at suitable intervals. The comb foundation indicated at 2 is supported by the frame 1 and by the reinforcing bars, the ends of which are anchored in the upper and lower bars respectively of the frame which engages the edges of the sheet of comb foundation, but leaving the center unsupported, and it is here that the reinforcing bars come into place, supporting the center of the sheet.

The foundation may be built about the bars, or the bars may be merely placed in close proximity thereto, that is, the comb foundation or the honey comb may be near to the bars in actual contact with, adhering to, or embedded in the sheets of comb foundation or honey comb.

In order to provide an efficient reinforce, which will properly support the comb foundation, I provide the reinforcing bars with notches, shoulders, projections or ledges, or in fact roughen the bars in any manner that the bars shall provide a variation in the angle of support radiating to all parts of the comb foundation from horizontal to a vertical angle of 90°, and the comb or comb foundation may engage within these shoulders, ledges or notches to properly support the sheet of comb foundation or honey comb.

In the bars shown at 3 in Figure 1, the recesses are provided by bending the bars in opposite directions, that is, offsetting laterally portions of the bars, the recesses being provided between the offsets, the whole presenting a sinuous or corrugated bar.

In Figure 3 the bar 4 which is rectangular in cross section, is provided with notches 5 at its opposite edges, the notches at one side edge of the bar being staggered with respect to those at the other side edge, and it will be noticed that each notch has an inclined wall and a wall substantially perpendicular to the bar. The notches are arranged with the perpendicular walls preferably facing upward.

In Figure 4 the bar is cylindrical, and four series of notches 7 are provided, the said notches being at angles of 90° with respect to each other. In Figure 5 the bar 8 is composed of two strands of wire twisted together, and the twisting provides the recesses for the comb or comb foundation to engage within.

In Figure 6 there is shown a construction wherein the reinforcing rod 9 has outwardly extending projections or spurs 10 which are arranged in series, the members of the series being relatively staggered.

I claim:

1. A reenforcement for comb and comb foundations and comprising a series of bars adapted to be disposed transversely and in spaced relation between the upper and lower bars of the comb frame, the ends of said bars anchored to said frame bars each of said reinforcing bars also having notches, recesses or projections providing shoulders or supports capable of supporting at any angle the comb or comb foundation.

2. A reenforcement for comb and comb foundation, comprising a series of bars adapted to be arranged transversely of the frame and in which the comb or comb foundation is built at spaced intervals, said bars being roughened.

3. A reenforcement for comb and comb foundations comprising a series of rods roughened from end to end and disposed in spaced relation between the top and bottom bars of the comb frame, the upper and lower ends of said reinforcing rods pinched and anchored within the top and bottom bars respectively of the comb frame.

4. A reenforcement for comb and comb foundations consisting of a bar adapted to be disposed within the comb frame said bar roughened along a portion of its length.

HENRY C. DADANT.